(12) United States Patent
Hall et al.

(10) Patent No.: US 8,738,488 B2
(45) Date of Patent: *May 27, 2014

(54) METHOD FOR BUSINESS ON-LINE ACCOUNT OPENING WITH EARLY WARNING SYSTEM

(75) Inventors: Lori Hall, Cary, NC (US); Alicia Silla, Apex, NC (US); Teresa Rose, Raleigh, NC (US)

(73) Assignee: Branch Banking & Trust Company, Raleigh, NC (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/603,290

(22) Filed: Oct. 21, 2009

(65) Prior Publication Data

US 2010/0057599 A1    Mar. 4, 2010

Related U.S. Application Data

(63) Continuation-in-part of application No. 12/540,188, filed on Aug. 12, 2009.

(60) Provisional application No. 61/088,267, filed on Aug. 12, 2008, provisional application No. 61/088,229, filed on Aug. 12, 2008, provisional application No. 61/088,239, filed on Aug. 12, 2008.

(51) Int. Cl.
*G06Q 10/00*    (2012.01)
*G06Q 30/06*    (2012.01)
*G06Q 40/00*    (2012.01)

(52) U.S. Cl.
CPC ............ *G06Q 30/06* (2013.01); *G06Q 40/00* (2013.01)
USPC .............................. 705/35; 705/325; 709/204

(58) Field of Classification Search
CPC ........................... G06Q 30/06; G06Q 40/00
USPC .................................................... 705/35
See application file for complete search history.

(56) References Cited

U.S. PATENT DOCUMENTS

| | | | | |
|---|---|---|---|---|
| 5,764,789 | A  * | 6/1998  | Pare, Jr. et al. | 382/115 |
| 6,230,148 | B1 * | 5/2001  | Pare et al. | 705/40 |
| 7,403,922 | B1 * | 7/2008  | Lewis et al. | 705/38 |
| 7,925,579 | B1 * | 4/2011  | Flaxman et al. | 705/38 |
| 2002/0120846 | A1 * | 8/2002  | Stewart et al. | 713/168 |
| 2002/0138371 | A1 * | 9/2002  | Lawrence et al. | 705/27 |
| 2005/0097320 | A1 * | 5/2005  | Golan et al. | 713/166 |
| 2005/0273442 | A1 * | 12/2005 | Bennett et al. | 705/67 |
| 2006/0068755 | A1 * | 3/2006  | Shraim et al. | 455/410 |
| 2006/0229961 | A1 * | 10/2006 | Lyftogt et al. | 705/35 |
| 2007/0226129 | A1 * | 9/2007  | Liao et al. | 705/38 |
| 2007/0244782 | A1 * | 10/2007 | Chimento | 705/35 |
| 2008/0228637 | A1 * | 9/2008  | Scipioni et al. | 705/39 |

* cited by examiner

*Primary Examiner* — Kirsten Apple
*Assistant Examiner* — Joan Goodbody
(74) *Attorney, Agent, or Firm* — Duane Morris LLP

(57) ABSTRACT

A method for a business customer interfacing with a financial institution through a computer network is presented. The method includes an early warning evaluation of the customer and/or entities associated with the customer to identify fraudster/abusers and prevent them from opening online accounts at the financial institution.

6 Claims, 18 Drawing Sheets

FIRST SET OF PREDETERMINED CRITERIA

- IS CUSTOMER NEW OR EXISTING CLIENT OF FINANCIAL INSTITUTION
- HAS CUSTOMER BEEN IDENTIFIED AS FRAUDSTER OF ABUSER BY FINANCIAL INSTITUTION
- HAS CUSTOMER BEEN IDENTIFIED AS FRAUDSTER BY SECOND FINANCIAL INSTITUTION
- DOES CUSTOMER IDENTITY VERIFICATION SCORE EXCEED A PREDETERMINED THRESHOLD

FIGURE 10A

SECOND SET OF PREDETERMINED CRITERIA

- IS CUSTOMER NEW OR EXISTING CLIENT OF FINANCIAL INSTITUTION
- HAS AUTHORIZED AGENT BEEN IDENTIFIED AS FRAUDSTER OF ABUSER BY FINANCIAL INSTITUTION
- HAS AUTHORIZED AGENT BEEN IDENTIFIED AS FRAUDSTER BY SECOND FINANCIAL INSTITUTION
- DOES CUSTOMER IDENTITY VERIFICATION SCORE FOR AUTHORIZED AGENT EXCEED A PREDETERMINED THRESHOLD

FIGURE 10B

PREDETERMINED SET OF BUSINESS RULES

- GO/NO GO OF SSN EVALUATION
- GO/NO GO OF ID THEFT EVALUATION
- GO/NO GO OF RETAIL INDICATOR EVALUATION
- GO/NO GO OF PREVIOUS INQUIRY EVALUATION
- GO/NO GO OF CLOSURE SUMMARY EVALUATION
- GO/NO GO OF CLOSURE DETAILS EVALUATION

FIGURE 11A

PREDETERMINED SET OF RISK EVALUATION RULES

- GO/NO GO OF SSN EVALUATION
- GO/NO GO OF ID THEFT EVALUATION
- GO/NO GO OF RETAIL INDICATOR EVALUATION
- GO/NO GO OF PREVIOUS INQUIRY EVALUATION
- GO/NO GO OF CLOSURE SUMMARY EVALUATION
- GO/NO GO OF CLOSURE DETAILS EVALUATION

| BUSINESS RULES | | | | |
| --- | --- | --- | --- | --- |
| HOT FILE | CLIENT (NEW OR EXISTING) | SHARED FRAUD | IDENTITY VERIFICATION (> THRESHOLD) | OUTCOME |
| YES | ANY | ANY | ANY | FAIL |
| NO | NEW | YES | ANY | FAIL |
| NO | NEW | NO | YES | FAIL |
| NO | NEW | NO | NO | PASS |
| NO | EXISTING | ANY | ANY | PASS |

1502

| AUTHORIZED REPRESENTATIVE RULES | | | | |
| --- | --- | --- | --- | --- |
| HOT FILE | CLIENT (NEW OR EXISTING) | SHARED FRAUD | IDENTITY VERIFICATION (> THRESHOLD) | OUTCOME |
| YES | ANY | ANY | ANY | FAIL |
| NO | NEW | YES | ANY | FAIL |
| NO | NEW | NO | YES | FAIL |
| NO | NEW | NO | NO | PASS |
| NO | EXISTING | ANY | ANY | PASS |

FIGURE 15A

| SIGNER RULES | | | |
|---|---|---|---|
| HOT FILE | SHARED FRAUD | IDENTITY VERIFICATION (> THRESHOLD) | OUTCOME |
| YES | ANY | ANY | FAIL |
| NO | YES | ANY | FAIL |
| NO | NO | YES | FAIL |
| NO | NO | NO | PASS |
| NO | ANY | ANY | PASS |

FIGURE 15B

METHOD FOR BUSINESS ON-LINE ACCOUNT OPENING WITH EARLY WARNING SYSTEM

RELATED AND CO-PENDING APPLICATIONS

This application claims priority to application Ser. No. 12/540,188 filed 12 Aug. 2009 and titled "System and Method for Business Online Account Opening" which claims priority to the following provisional applications, the entirety of each is hereby incorporated herein by reference in its entirety: "System and Method for Business Online Account Opening", Ser. No. 61/088,267 filed 12 Aug. 2008; "System and Method for Retail Online Account", Ser. No. 61/088,229 filed 12 Aug. 2008; and "System and Method for an Electronic Lending System", Ser. No. 61/088,239 filed 12 Aug. 2008. Additionally, this application hereby incorporates herein by reference, in their entirety, each of the following applications: "System and Method for Retail Online Account", Ser. No. 12/561,118 filed 16 Sep. 2009; and "System and Method for an Electronic Lending System", Ser. No. 12/561,125 filed 16 Sep. 2009.

BACKGROUND

Increasingly the public is going on-line for a variety of transactions and information. More than 30% of the population have personal computers and modems. Furthermore, over 60% of people with bank accounts have personal computers and modems. At the same time the number of people subscribing and using on-line services is greater than 40 million, and this number is growing at an exponential rate.

As the public uses computers with a greater frequency, more financial transactions are being automated and performed via computer. There is good motivation to bank on-line. On-line banking provides convenience, safety, cost savings, and potentially new types of services not readily or conveniently available via in-person banking. Such potentially new services include access to superior up-to-the minute information, on-line investment clubs, information filters, and search agents.

With the increase in the number of financial transactions performed on-line, the convenience and cost-savings of banking on-line also increases. Additionally new and more powerful methods are being developed for protecting the security of financial transactions performed on-line. The result is that convenience, cost savings and enhanced security have combined to make on-line financial services more useful and effective, thereby driving the development of newer and more integrated services. More sophisticated financial systems that offer greater integration and a high degree of user control enable on-line users to synthesize, monitor, and analyze a wide array of financial transactions and personal financial data.

Currently, methods exist for users to perform a variety of on-line financial transactions. These methods however fail to offer on-line account opening including qualification verifications. For example, users may bank on-line, thereby enabling performance of transactions, such as transfers from one account to another, but must already have the established account in the financial institution.

In view of the increase of electronic commerce in the market place the present subject matter discloses a unique on-line account opening method. The disclosed subject matter enables a stream-lined entry to an on-line banking presence.

A method is needed in which business customers may establish an on-line account, be enrolled in financial offerings as a result of qualification and verification of the qualification based on a set of criteria.

In order to obviate the deficiencies of the prior art, the present disclosure presents a novel method for interfacing with a financial institution using a computer interface. In the method a customer request is received from a customer that has reached a predetermined webpage of the financial institution using a computer network. A first content is presented to the customer, and a first input is received from the customer. If the customer is an on-line client of the financial institution then a first set of information is received from the customer for determining the same, the first set of information of the on-line client is authenticated and verified with a pre-existing client identification profile for the customer. A second set of information is received from the customer and presented back to the customer for review.

In the method, a third set of information is further received from the customer, the third set of information including the second set of information and any modification to the second set of information made by the customer upon their review. The terms and conditions are presented to the customer and an application is received from the customer. The first part of the third set of information is verified if the customer is a sole proprietor and the second part of the third set of information is verified if the customer is not a sole proprietor using a first set of predetermined criteria.

In the method, the customer's credit score is determined using a second set of predetermined criteria and a set of account options is presented to the customer, the account options presented being based at least in part on the verification of the third set of information and the customer's credit score. A second input is received from the customer; the second input is verified and it is determined if the customer is to be enrolled for a check card. The customer is processed for check card enrollment at a predefined level based at least on one or more predetermined factors.

Also in the method, it is determined if the customer is to be enrolled in a business on-line program and a merchant services program. The customer is processed for enrollment in the merchant services program at a predefined level based at least in part on one or more predetermined factors. The customer is then presented with information related to the customer's products accounts and/or enrollments.

Furthermore, the method also contemplates the implementation and use of a real time early warning system for fraud detection and identity verification during the online account opening process. The customer may undergo this real time risk screening process using the early warning system by having business rules applied to entities associated with the customer. For example, one entity associated with the customer may be identified by the business name the customer uses. Another entity may be identified by the name of the authorized representative identified by the customer. Yet another entity may be identified by the name of the signer identified by the customer. Other entities besides those listed above are contemplated by this disclosure. Of course, the "name" may also include other identifying information such as address, phone number, tax identification number, a government-issued identification number, etc. Additionally, the early warning system may differentiate between a customer who is currently an online client of the financial institution and a customer who is not currently an online client of the financial institution.

In a typical prior art financial institution online interfacing process, fraud detection and identity verification of a customer opening an online account may not take place until sometime after the online account has been opened and is accessible to the customer. Obviously, this puts the financial institution in a position of unnecessarily heightened risk. Earlier fraud detection and identity verification processes are necessary to reduce this unnecessary risk to the financial institution. Otherwise a fraudster may have access to a fraudulently-obtained online account before the account is shut down.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 10A is a representative chart listing criteria that makes up a first set of predetermined criteria according to an embodiment of the disclosed subject matter.

FIG. 10B is a representative chart listing criteria that makes up a second set of predetermined criteria according to an embodiment of the disclosed subject matter.

FIG. 11A is a representative chart listing business rules that makes up a predetermined set of business rules according to an embodiment of the disclosed subject matter.

FIG. 11B is a representative chart listing risk evaluation rules that make up a predetermined set of risk evaluation rules according to an embodiment of the disclosed subject matter.

FIG. 15A is a table representing business rules and a table representing authorized representative rules for an embodiment of an early warning system of the disclosed subject matter.

FIG. 15B is a table representing signer rules for an embodiment of an early warning system of the disclosed subject matter.

DETAILED DESCRIPTION

Figure 1:
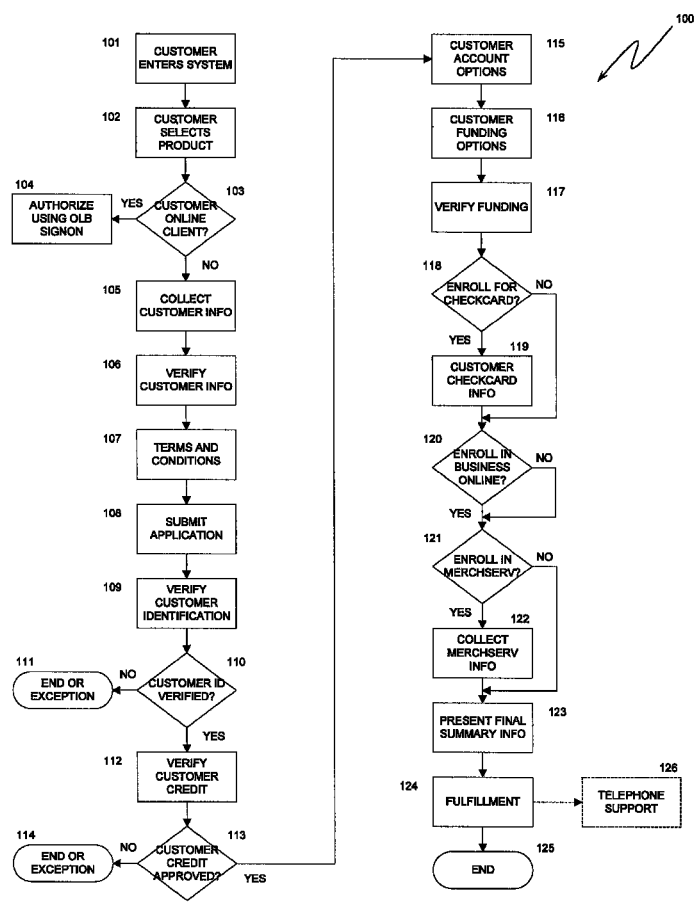
FIG. 1 is a flow chart of an embodiment of the disclosed subject matter.

FIG. 1 illustrates a process in which a customer may open an on-line business account via a computer network, e.g., the Internet, by accessing and exchanging information using the website of a financial institution. The customer enters the system by accessing or being directed to the institutions' website (webpage) as shown in Block 101. In either event, a request for the website is received by the financial institution's server or proxy server. The customer is presented a list of products such as a checking account, savings account, or brokerage account or any of a number of financial products offered by the institution. These financial products may also include a deposit account, which may be in the form of a certificate of deposit, individual retirement account, retirement account, a 401(k) account or combination thereof. The products presented to the customer may also be a function of path used by the customer to arrive at the website. For example, if the customer accessed the website via a hyperlink on another site directed to retirement, only the retirement accounts may be presented, or the entire scope of products is presented but the retirement accounts are highlighted. In this manner, the most relevant products based on the customers path may be brought to the customers attention.

Figure 2:
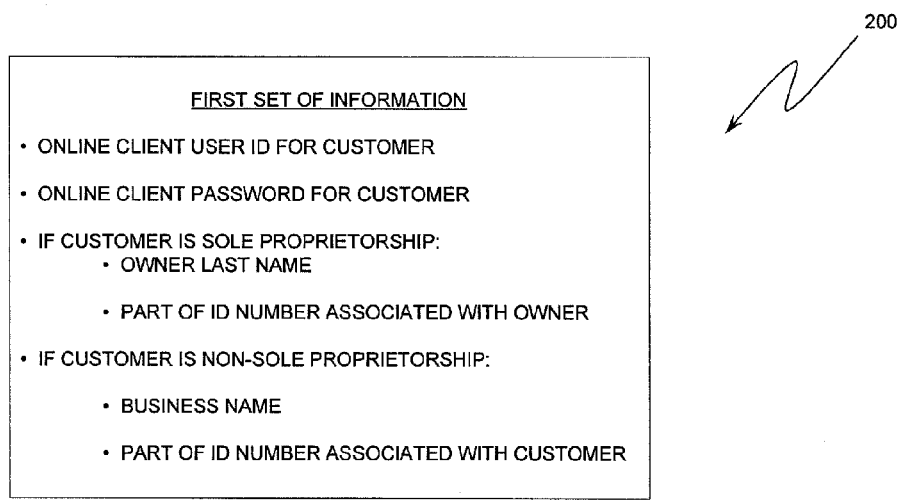
FIG. 2 is a representative chart listing information that makes up a first set of information according to an embodiment of the disclosed subject matter.

Following FIG. 1, the customer may then select a product from the products presented as shown in Block 102. The customer's choice is received by the server. An evaluation of whether the customer is a current on-line client of the financial institution takes place as shown in Block 103. Existing on-line customers advantageously are given the opportunity to streamline the application process. A first set of information is requested of and received from the customer in determining if the customer is a current on-line client. The first set of information may include an on-line client user ID for the customer, an on-line client password for the customer, and if the customer is a sole proprietorship, the last name of the owner and/or part of the ID number associated with the owner and if the customer is not a sole proprietor, the business name and/or part of the ID number associated with the customer, as shown in FIG. 2, or other identifying indicia/code that enables the identification of the customer to the customer's established account(s). Upon receiving the first set of information, the information is authenticated with the on-line information kept or known by the financial institution and a pre-existing client identification profile is verified. If the customer is determined to be a current on-line client as shown in Block 103, then the customer is authorized using on-line banking sign on as shown in Block 104.

Figure 3:
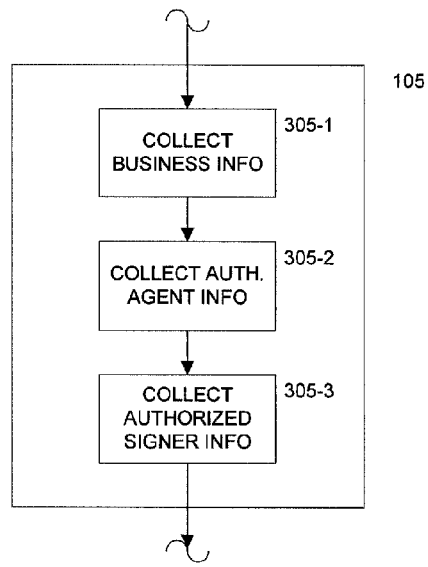
FIG. 3 is a flow chart representing collection of information according an embodiment of the disclosed subject matter.

If the customer is not a current on-line client of the financial institution, a second set of information is requested and collected from the customer as shown in Block 105. FIG. 3 illustrates a number of steps that may be included in collecting the second set of information.

FIG. 3 show the collection of business information in Block 305-1, authorized agent information in Block 305-2 and the collection of an authorized signer information in Block 305-3. This second set of information may include a wide variety of business information including business name, physical address, headquarter, phone number, organization type, establishment date, domestic or foreign, State of incorporation, other DBAs, industry, business classification, sales and/or number of employees. The customer may select the type of identification from a dropdown list that includes common ID types. Table 1 lists the Business Type and Common ID type.

TABLE 1

| Business Type | Common ID Type |
| --- | --- |
| General Partnership | Partnership Agreement |
| LLP | Articles of Partnership |
| LLC | Articles of Limited Incorporation |
| Corporation | Articles of Incorporation |
| All Non-Sole Proprietorships | Business License |

The authorized Agent information may include owner information as well. Examples of the authorized agent information include the name of the authorized agent, his/her physical address, date of birth, SSN, relationship to the company (e.g. Owner, Partner, Manager, Member, President, Vice President, Secretary, Treasure or other), contact information such as phone numbers and email addresses, citizenship, and information regarding the characteristics of the identification (e.g. type, ID Number, State of issuance, issue date and expiration date). The authorized signer or business resolution information collected in Block 305-3 may include information on signers who may legally bind the customer. The information may include name of signer(s), Title as well as other information related to the signers.

The second set of information is verified as shown in Block 106. This verification may include presenting back to the customer for review the second set of information and receiving a third set of information which includes any corrections to the second set of information the customer has made. The website may allow and request the customer to annotate, modify or otherwise change incorrect or incomplete information upon its presentation to the customer. The third set of information may include as noted previously several parts. The customer is also provided with a set of terms and conditions which may govern the use of the website, on-line banking, application process, liabilities, etc, as shown in Block 107. The terms and conditions may also include a customer check-off which may be required to continue and ensure they have been at least noticed, if not reviewed by the customer. An application for a product may be submitted by and received from the customer as shown in Block 108.

The customer identification is then verified in Block 109. An embodiment of a process to verify the customer identification is shown on FIG. 4. The customer is first determined to either be a sole proprietorship or not as shown in Block 409-1.

If the customer is a sole proprietorship, a first part of the third information may be determined as shown in Block 409-2. This may include providing information to a third party or to an institution-operated database such as may be owned and/or operated by a financial institution. The first part of the third information may be evaluated as shown in Block 409-4, this evaluation may be based on a comparison of known information with the information collected from the customer as the first part of the third set of information. This evaluation may utilize a first set of predetermined criteria. The first set of predetermined criteria, as listed in FIG. 10A, may include whether the customer is a new or an existing client of the financial institution; whether the customer has been identified as a fraudster or abuser; whether the customer has been identified as a fraudster by a third party and whether the customer identity verification score exceeds a predetermined threshold. These and other criteria may be used to assess the legitimacy of the customer and may be included in the set of predetermined criteria in verifying the first part of the third set of Information. Upon evaluation, a score or index may be determined reflective of the outcome of the evaluation. For example, if the name, address, phone number and SSN match, a score reflecting a high matching comparison may be given, whereas when one or more of these do not match, a score reflecting a lower matching comparison may be applied. The customer may then be queried regarding answers related to his/her identity for verification as shown in Block 409-6. Questions in the query may include for example information typically known only to the individual, such as mother's maiden name, previous address, banking accounts, etc. The answers provided by the customer may be verified in Block 409-8. Based on the score or index relating to the first part of the third information and the verification of the customers answer to the identity query the customer may be authenticated as shown in Block 409-10.

Figure 5A:
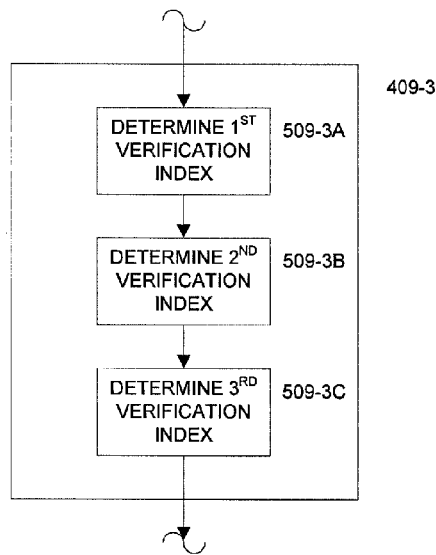
FIG. 5A is a flow chart representing the determination of verification index according to an embodiment of the disclosed subject matter.
Figure 5B:
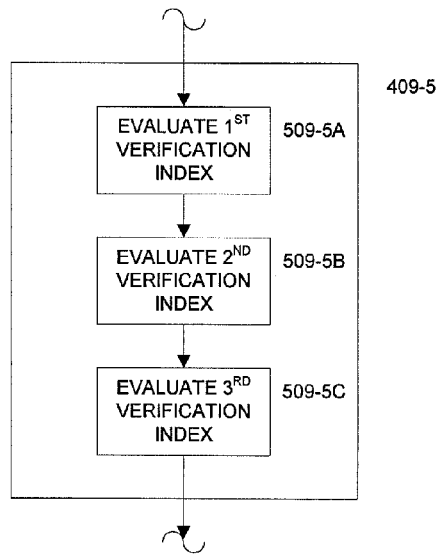
FIG. 5B is a flow chart representing the evaluation of verification index according to an embodiment of the disclosed subject matter.

If the customer is determined not to be a sole proprietorship in decision Block 409-1, then a second part of the third information may be determined as shown in Block 409-3. The second part of the third information may be evaluated as shown in Block 409-5. This evaluation may utilize a second set of predetermined criteria. The second set of predetermined criteria, as listed in FIG. 10B, may include whether the customer is a new or an existing client of the financial institution; whether the customer has been identified as a fraudster or abuser; whether the customer has been identified as a fraudster by a third party and whether the customer identity verification score exceeds a predetermined threshold. These and other criteria used to assess the legitimacy of the customer may be included in the second set of predetermined criteria in verifying the second part of the third set of Information. The first part of the third set of information and the second part of the third set of information may have common information and thus need not be mutually exclusive. These criteria allow for the application of internal decisioning rules. FIGS. 5A and 5B show steps that may be used in verifying the second part of the third set of information.

Turning to FIG. 5A, a first verification index is determined as shown in Block 509-3A. A second verification index is determined as shown in Block 509-3B and a third verification index is determined in Block 509-3C. Each verification index represents evaluations using a particular set or area of information. The sets or areas of information may or may not be mutually exclusive. One verification index may be based on the business information which includes searches drawn from public business records and business directories. Another verification index may be based on the applicant information, for example name, address, Social Security Number (SSN) and contact information. Yet another verification index may be based on the relationship between the business and the authorized representative. This latter index may be based on the degree to which the agent can be linked to the business based on public records. These verification indices may be performed internal to the financial institution or by a third party. In FIG. 5B, the first, second and third verification indices are determined in Blocks 509-5A, 509-5B and 509-5C, respectively. Additional verification indices may also be employed.

Figure 6:
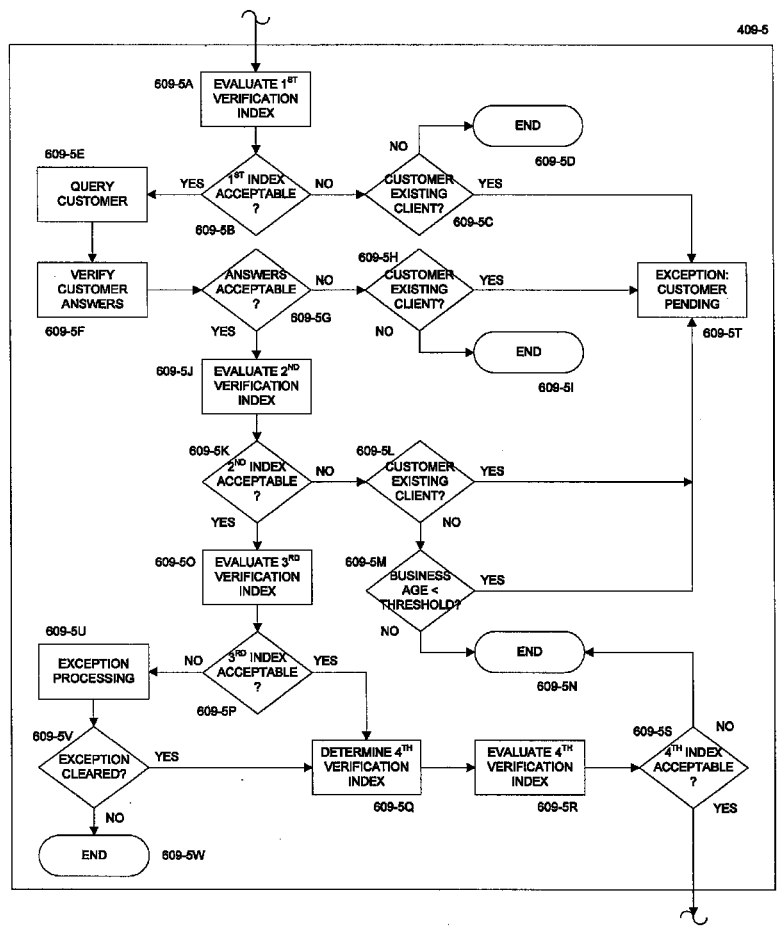
FIG. 6 is a flow chart representing the acceptance of a customer including exceptions of the verification indices according to an embodiment of the disclosed subject matter.

FIG. 6 is a flow chart demonstrating the uses of the verification indices in the internal decision making process as noted earlier. The first verification index is evaluated as shown in Block 609-5A. The first verification index is then compared to a threshold to determining if it is acceptable as shown in Block 609-5B. If the first index is not acceptable then the decision process looks to whether the customer is an existing client as shown in Block 609-5C. If the customer is not an existing client the application process ends as shown the Block 609-5D. If on the other hand, the customer is an existing client or some other trigger is met, the customer is provided an exception to terminating the process and a decision to proceed becomes pending as shown in Block 609-5T. Customers pending may be manually reviewed by the financial institution, however information and product presentation may continue until the review is completed.

Figure 4:
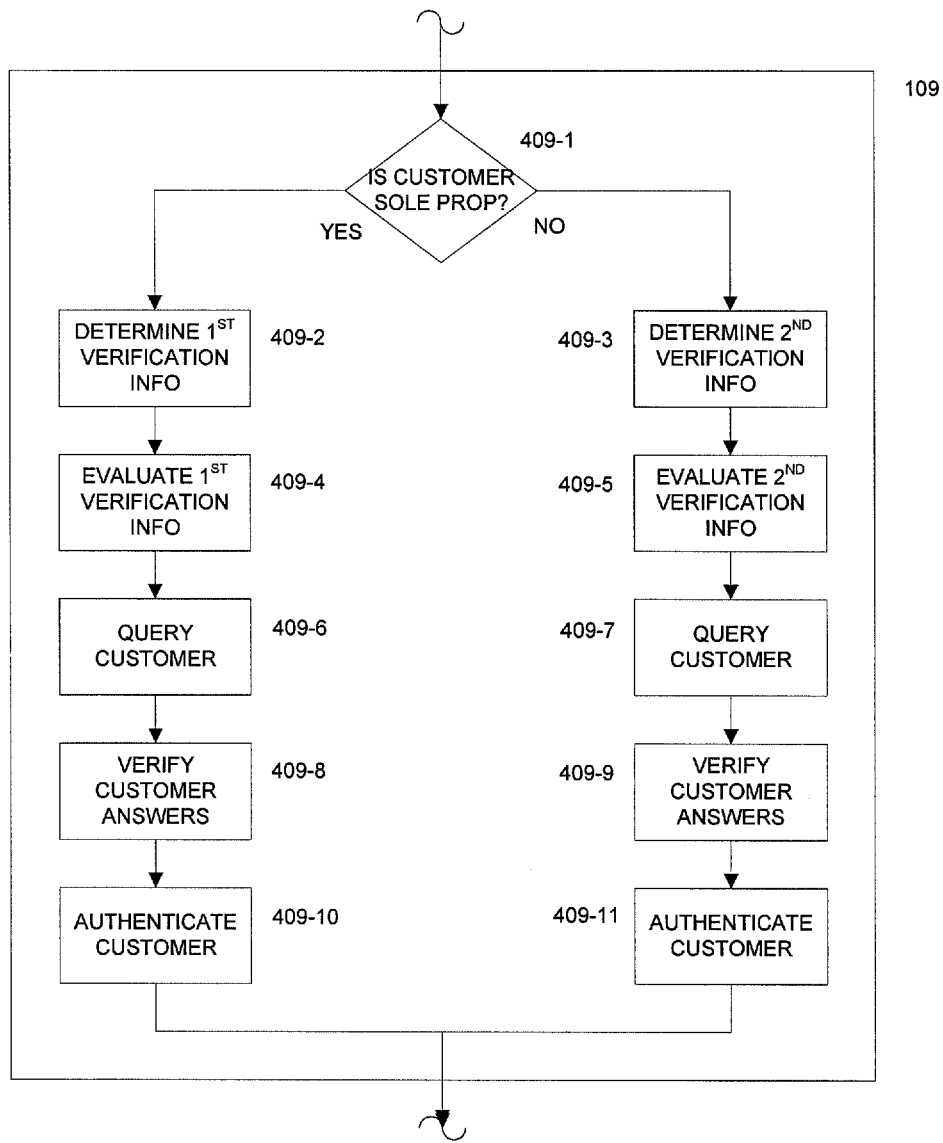
FIG. 4 is a flow chart representing evaluation, verification and authentication of a customer according to an embodiment of the disclosed subject matter.

If the first verification index is determined to be acceptable in Block 609-5B, the customer is further questioned as shown in Block 609-5E and Block 409-7 of FIG. 4, specifically questions for the authorized representative that authenticate the identity of the agent may be asked. The given answers are verified in Block 609-5F, Block 409-9, and a determination as to the acceptability of the answers is made in decision Block 609-5G. If the answers are found to be unacceptable, such as incomplete or false answers regarding the relationship of the customer to the financial institution, a determination is made as to whether the customer is an existing client as indicated in decision Block 609-5H, If the customer is an existing client of the financial institution, the customer is provided an exception and a manual review may be performed as represented by Block 609-5T. The customer is "pending" as discussed above and while further processing directed to acceptance of the application may be halted, information may continue to be collected and products may continue to be presented. It is important to note that both the business and the identity of the agent should be verified when dealing with a non-sole proprietorship. If the customer is not an existing client the application process ends as shown in Block 609-5I.

If the customer's answers are found acceptable in Block 609-5G the second verification index is evaluated as shown in Block 609-5J. If the second verification index is found not acceptable in Block 609-5K there is a determination of whether the customer is an existing client of the financial institution in decision Block 609-5L. If the customer is an existing client the application becomes pending as shown in Block 609-5T. If the customer is not an existing client a determination is made regarding how long the customer's business has been an ongoing enterprise or how old the business is. If the business age is less than a predetermined threshold age as determined in decision Block 609-5M the customer is placed in a pending stage as represented by Block 609-5T. The addition of exceptions processing is advantageous, for example, when the business is verified but the authorized agent has not been satisfactorily verified. The age of the business may be another indication of legitimacy. If the age of the business is not less than the threshold, the application process may end as shown in Block 609-5N. As shown further in FIG. 6, if the second verification index is found acceptable in Block 609-5K, an evaluation of a third evaluation index may be performed in Block 609-5O.

If the third verification index is not acceptable as determined in decision Block 609-5P, exception processing may be commenced as indicated in Block 609-5U. If the exception is not cleared in Block 609-5V, the process may end at Block 609-5W. If the exception is cleared in Block 609-5V or if the third verification index is acceptable as determined in Block 609-5P a fourth verification index may be determined as shown in Block 609-5Q, evaluated in Block 609-5R and a determination of its acceptability made in decision Block 609-5S. If the fourth index is not found to be acceptable the process may end as shown in Block 609-5N. If the fourth verification index is acceptable and the customer is authenticated as shown back on FIG. 4 in Block 409-11 then the process continues. The authentication is preferably based on the score or index relating to the second part of the third information and the verification of the customers answer or answers to the identity query.

In the embodiment shown in FIG. 6, the first verification index may be a business verification index, the second verification index may be an authorized representative verification index and the third may be an authorized representative to business index. The order of which some or all of the indexes are evaluated may be modified.

Returning to FIG. 1, if the customer identification is not verified in decision Block 110 the process ends or as discussed in relation to FIG. 6 an exception may be granted as shown in Block 111 of FIG. 1. If the customer ID is verified, the customer's credit score which may preferably be representative of the customer's credit worthiness is determined and verified as shown in Block 112. The credit score may be determined using a predetermined set of business rules such as those listed in FIG. 11A and/or using a predetermined set of risk evaluation rules such as those listed in FIG. 11B. The predetermined set of business rules may include decisions on one or more of a social security number evaluation, an identity theft evaluation, a retail indicator evaluation, a previous inquires evaluation, a closure summary evaluation, and a closure details evaluation. The decisions may be go/no-go or may be qualitative in nature. For example, if the social security number does not match the name, a no-go decision may be rendered, whereas the previous inquiries evaluation may result in a go/no-go decision or a qualified approval dependent upon another condition. Of course additional criteria reflective of the customer's credit worthiness may also be applied.

Figure 7:
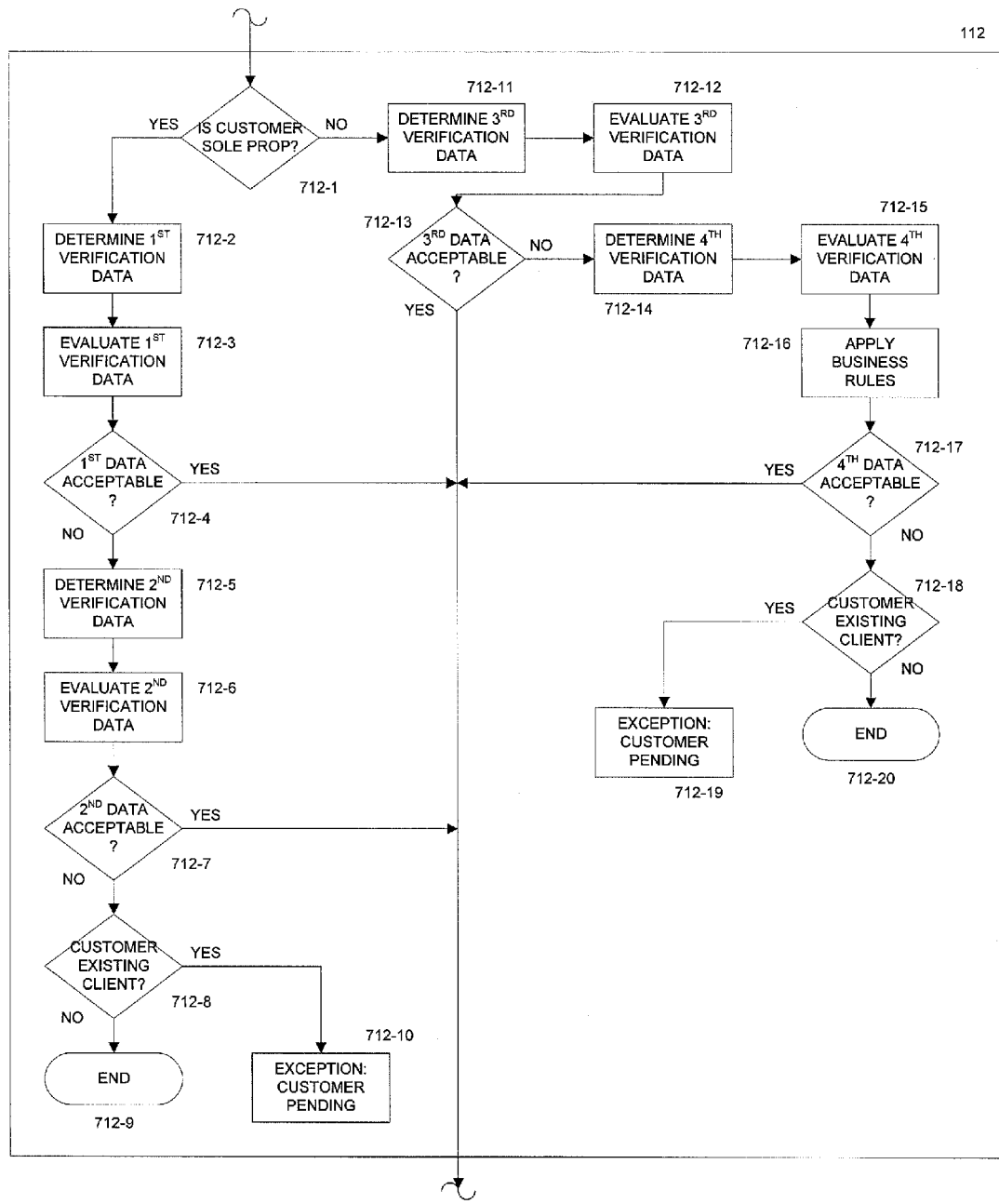
FIG. 7 is a flow chart representing the acceptance of a customer including exceptions of the verification indices according to another embodiment of the disclosed subject matter.

FIG. 7 is an embodiment for verifying customer credit according to an embodiment of the present subject matter. The process may be dependent upon the nature of the customer and thus again it is determined in decision Block 712-1 whether the customer is a sole proprietorship or not. If it is determined that the customer is a sole proprietorship in Block 712-1, a first set of verification data is determined and evaluated in Blocks 712-2 and 712-3, respectively. The first set of verification data may include owner information derived from an third party or held internally by the institution. The first set of verification data may be the information commonly managed by credit reporting agencies such as Equifax™. This information may be advantageously used to determine the credit risk. If the first verification data is acceptable as shown in decision block 712-4, the application procedure continues. If the first set of data is not acceptable a second set of verification data is determined and evaluated as shown in Blocks 712-5 and 712-6, respectively. The second verification data may also include owner information and the evaluation may be performed using a third party or internally. One such example of another third party determining and evaluating the second set of verification data is ChexSystems™. If the second set of verification data is found acceptable in decision Block 712-7, then the application proceeds from Block 113 in FIG. 1. However, if the second set of verification data is not acceptable, a determination is made whether the customer is an existing client of the financial institution, as shown in decision Block 712-8. If the customer is an existing customer, the customer application becomes pending and may be granted an exception after a manual review, as represented by Block 712-9. Otherwise the application process is terminated as shown in Block 712-9. If the customer is found not to be a sole proprietorship a parallel process is taken.

Non-sole proprietorship customer's third set of verification data is determined and evaluated in Blocks 712-11 and 712-12 respectively. The third set of verification data may include business and authorized agent information and evaluated with information held by a third party or internally by the financial institution. If the third set of verification data is found acceptable in decision Block 712-13, the application process continues. If the third set of verification data is not acceptable a fourth set of verification data is determined and evaluated as shown in Block 712-14 and 712-15 respectively. The fourth set of verification data may also include business and authorized agent information and its evaluation may include comparison with information held by a third party or internally by the financial institution. The fourth set of verification data is also applied to a set of business rules established by the financial institution as shown in Block 712-16. The set of business rules may include decisions based on social security number evaluation, an identity theft evaluation, a retail indicator evaluation, a previous inquiries evaluation, a closure summary evaluation and a closure details evaluation. These rules may relate to past business activities of the authorized agent or owner. A list of the predetermined set of business rules is presented in FIG. 11A.

If the fourth set of verification data along with the application of business rules is acceptable as shown in decision block 712-17, the application process continues. The decision may be a go/no-go or may be qualitative in nature. However, if the data and application of the business rules are not acceptable, a determination regarding the customer's status as an existing client is made, as shown in Block 712-18. If the customer is an existing client and exception may be made and the customer may become pending subject to a manual review as shown in Block 712-19. If at this point in the application process the customer is not a client, the application process may be halted as shown in Block 712-20.

Table 2 illustrates an exemplary application of the business rules. The Hot File is whether the customer has a hit on the liability risk management file (LRM) and the Outcome is whether the application process continues.

TABLE 2

| Hot File | Client (new or existing) | Shared Fraud Database | Identity Verification (Score exceeds threshold) | Outcome |
|---|---|---|---|---|
| Yes | Any | Any | Any | Fail |
| No | New | Yes | Any | Fail |
| No | New | No | Yes | Fail |
| No | New | No | No | Pass |
| No | Existing | Any | Any | Pass |

Referring back to FIG. 1, a decision on the customer's credit is made as shown in Block 113. If the customer's credit is not approved, an exception may be made or the application process may be terminated as shown in Block 114. One process of ending the application or granting an exception is discussed above with respect to FIG. 7. If the customer's credit is accepted, customer account options are presented as shown in Block 115.

The account options presented may be based at least in part on the verification the third set of information and the information regarding the customer's credit score. The account options presented may also be a function of the set of risk evaluation rules as shown in FIG. 11B. These rules may include decisions on a social security number evaluation, an identity theft evaluation, a retail indicator evaluation, a previous inquires evaluation, a closure summary evaluation and a closure details evaluation. The decisions may be go/no-go or may be qualitative in nature. For example, if the social security number does not match the name, a no-go decision may be rendered, whereas the previous inquires evaluation may result in a go/no-go decision or a qualified approval dependent upon another condition.

Figure 8:
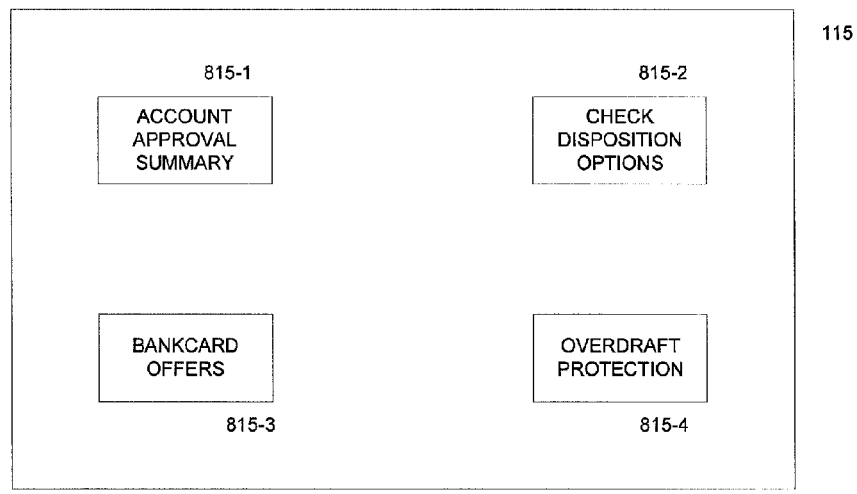
FIG. 8 is a representative chart of account services offered according to an embodiment of the disclosed subject matter.

The options presented to the customer may vary, however, a preferred list of account options are shown in FIG. 8. The options may include account approval summary as shown in Block 815-1, check disposition options, Block 815-2, Bankcard Offers, Block 815-3 and overdraft protection, Block 815-4. The account approval summary Block 815-1 may include information based on the outcome of the business identity and credit based risk verification as performed in the application process as well as affirmative indicia reflective of the approval status, such as approved or pending. The account approval summary may also indicate which additional information is required. The check disposition options, Block 815-2, may check status and include image statements of checks as well as other features representative of the disposition. The bankcard offers, Block 815-3, may include an offer or invitation to apply, it may include current interest rates and other terms or features available on the bankcards. The overdraft protection options, Block 815-4, may include several overdraft protection options based on the business relationship with the financial institution and the evaluation of the various information related to the customer. The overdraft protection options also presents options relating the linking of accounts and creation of new accounts for linking if none presently. Upon the selection of the account options, funding option may then be presented to the customer as shown in Block 116. The funding options presented may advantageously be based on the options selected by the customer.

The funding options are the methods in which the account options are to be created or funded. These options may include sending of a check, making a deposit at the financial institution or an affiliate, transfer of funds from another external financial institution or a transfer from a pre-existing account at the financial institution. In addition, other information may be requested from the customer for compliance purposes. The funding source may then be verified as shown in Block 117 by presenting back to the customer all accounts, funding methods, source of initial funds and the amount originally entered. The customer may modify any of the funding information before finalizing and submitting the funding. The customer may then be qualified for a check card.

In decision Block 118 it is determined whether the customer is to be enrolled for a check card. The decision to be enrolled in a check card may be determined as a function of the information previously supplied by the customer. If the customer is to be enrolled for a check card, information regarding the enrollment is collected and a level of enrollment is determined as shown in block 119. The level of enrollment may be based on at least one or more predetermined factors based upon risk factors or business factors, for example a low credit score would lead to a lower level while high business revenues may advocate for a higher level of enrollment. In addition the type of business and status of other accounts may also be used to determine the level of enrollment for the check card. Table 3 shows exemplary levels of enrollment, with relative spending and withdrawal limits. It is next determined if the customer is to be enrolled in Business on-line as shown in Block 120.

TABLE 3

| Authorization | Level | Daily Spending Limits | ATM Withdrawal Limit |
|---|---|---|---|
| Signer/Authorized Representative | High | $6,000 | $1,500 |
| Signer/Authorized Representative | Medium | $3,500 | $1,000 |
| Signer/Authorized Representative | Low | $1,500 | $500 |

The business on-line program includes collecting enrollment information and determining a statement suppression option. A decision to enroll the customer in merchant service program may be determined as shown in Block 121. Information required for enrollment in merchant service is collected as shown in Block 122.

Figure 9:
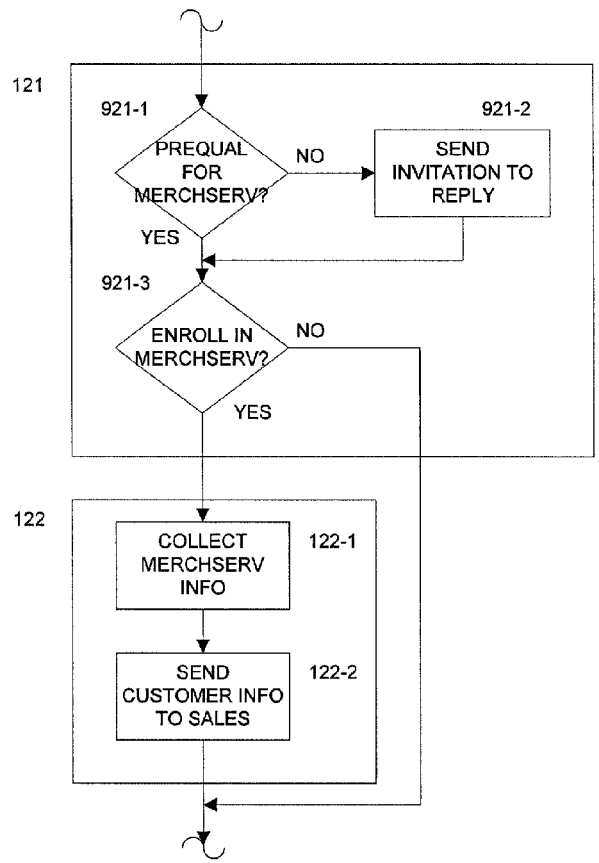
FIG. 9 is a flow chart representing the qualifying of a customer for merchant service according to an embodiment of the disclosed subject matter.

FIG. 9 is a flow chart for an embodiment for enrollment in merchant service. Based on known information and one or more predetermined factors, it may be determined if the customer may be prequalified for merchant service as shown in decision block 921-1. If the customer is situated to be prequalified an invitation to apply is sent to the customer as shown in Block 921-2. If the customer is prequalified, they are presented with the option to enroll in decision Block 921-3. If the customer chooses to enroll, information necessary for enrollment is collected in Block 122-1 and customer information is sent to the sales department as shown in Block 122-2 as a lead. Thereafter the merchant service provider may contact the customer to further the enrollment into the service. This same process may be used to provide other third party vendors with the opportunity to provide the customer with services related to their business type, needs or financial situations, without the financial institution having to disclose information to unsolicited third parties.

The customer is presented with a final presentation including customer information related to the customer's products, accounts and or enrollments reflective of the status of their on-line banking opening as shown in Block 123. The final presentation may present a summary of the product offerings selected by the customer. The name on the check card, authorization level and tier may also be displayed for all check cards enrolled. Business On-line Program user ID and company ID may be displayed also with information associated with their use. Accounts having overdraft protection selected, may also be identified along the overdraft account information. Bank Card offers that were accepted may be displayed as well as other third party offers accepted by the customer. The nearest branch location and other information a new client would find useful may be displayed as well. Contact information including phone number, addresses, email addresses and web pages may be presented to the customer during final presentation.

Additional products and offers may be communicated to the customer in the final summary, these products and offers may be only tangentially related or provided by third parties, these advertisements may also be presented based on the information collected during the on-line process and may be selected by the financial institution. Selection by the financial institution prevents the unwanted disclosure of private information but still allows the advertising to be marketed based on financial or business status. The customer may also be given the opportunity to order checks and other products related to the opening of the account. For this additional product offering, the customer may be connected to another site. Upon fulfillment of the terms and conditions of enrollment and funding, the on-line banking opening may be complete as shown in Block 124. Telephone support may thus begin as shown in Block 126, and the opening process ends as shown in Block 125. Telephone assistance may also be available while in the process of on-line banking enrollment, to further aid the process.

Embodiments of the disclosed subject matter may utilize drop down menus to show the options available to the customer and simplify their selection. The website format may also be selectable for use in mobile equipment such as Blackberries and PDA equipment, where screen space and functionality may be more limited than on a personal computer. Communications between the customer and the financial institution during the opening of an account may advantageously be encrypted.

As discussed above, in a typical prior art financial institution online interfacing process, fraud detection and identity verification of a customer opening an online account may not take place until after business hours the day the online account is opened or, perhaps, the next business day after an online account has been set up at the financial institution. Therefore, under certain circumstances, the fraud detection and identity verification of the customer may not take place until four days after an online account is opened. For example if the online account is opened on the Friday before a three-day weekend, the fraud detection and identity verification processes may not take place until the following Tuesday. Obviously, this puts the financial institution in a position of unnecessarily heightened risk. Earlier fraud detection and identity verification processes are necessary to reduce this unnecessary risk to the financial institution. Otherwise a fraudster may have access to a fraudulently-obtained online account for four days before the account is shut down.

Figure 12:
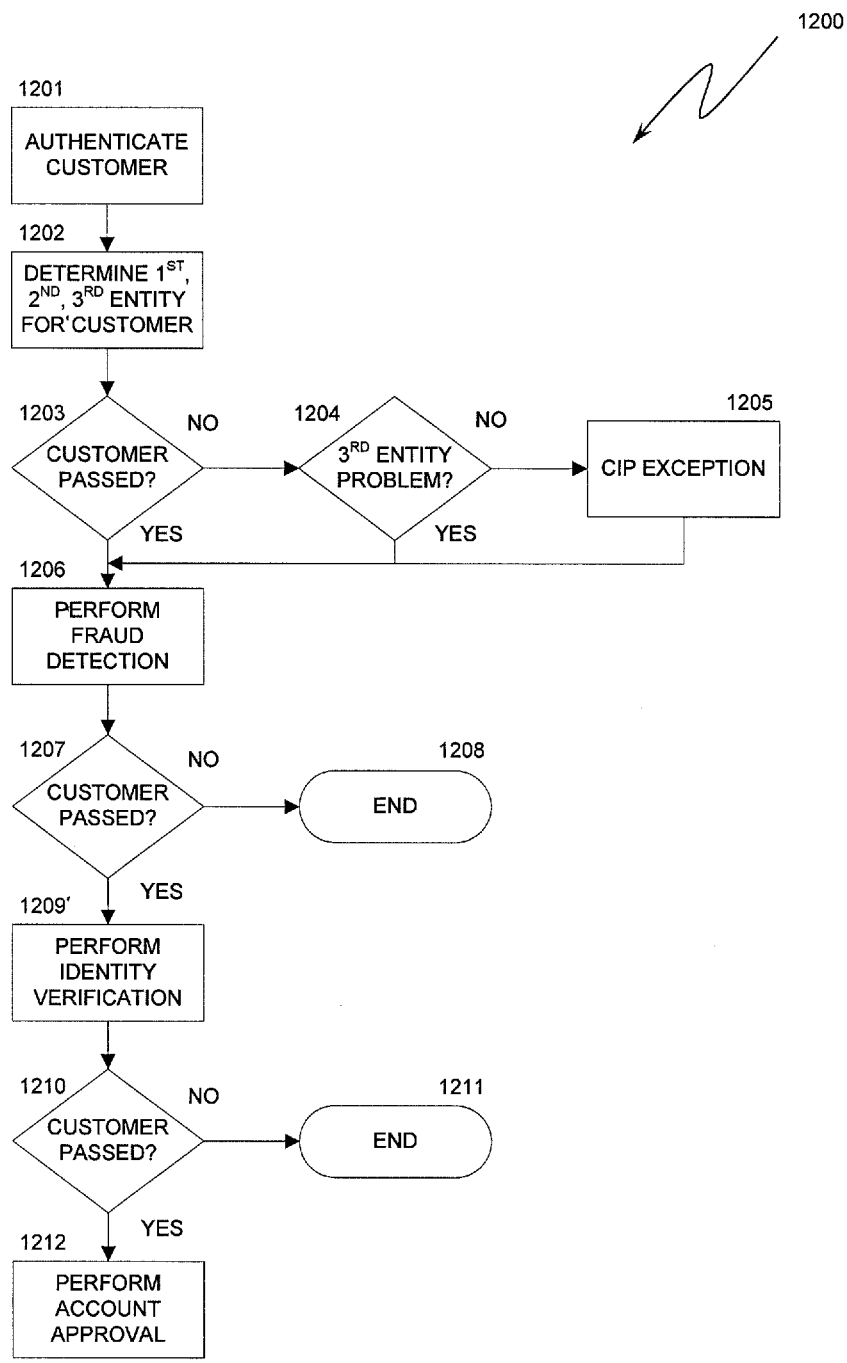
FIG. 12 is a flow chart representing an embodiment of a method for interfacing with a financial institution comprising the disclosed early warning system subject matter.

FIG. 12 is a flow chart of an embodiment of a method for interfacing with a financial institution comprising the disclosed early warning system subject matter. Typically, a customer may connect via a computer network (e.g., the internet, an intranet, an extranet, a wide area network, a piconet, a telephony network, a wireless network, etc.) to a website for a financial institution and request to interface with the financial institution through the website. The request may be, for example, to open an online business account, as described herein, with the financial institution. The financial institution may receive identification information for the customer and, at Block 1201, the financial institution may attempt to authenticate the customer by, among other things, referring to a predetermined client identification profile ("CIP"). The CIP may contain information (public or otherwise) about the customer that was obtained either by the financial institution or for the financial institution from other sources. At Block 1202 the financial institution may determine entities associated with the customer. For example, one entity associated with the customer may be identified by the business name the customer uses. Another entity may be identified by the name of the authorized representative identified by the customer. Yet another entity may be identified by the name of the signer identified by the customer. Other entities besides those listed above are contemplated by this disclosure. Of course, the "name" may also include other identifying information such as address, phone number, tax identification number, a government-issued identification number, an e-mail address, etc.

At decision Block 1203 a determination may be made as to whether the customer has passed the authentication process. The determination of passing the authentication process may be based on individual checks on one or more of the entities associated with the customer. If the customer did not pass the authentication process, a determination may be made at decision Block 1204 as to whether a particular entity, e.g. the business and/or the authorized representative is one of the causes for the customer's failure to pass the authentication process. If the determination is that the cause for the authentication failure may be due to the business and/or authorized representative failing the authentication process (or that the signer is not the cause for the customer's failure to pass the authentication process) then at Block 1205 a CIP exception may be made. The CIP exception may require that the financial institution contact the customer directly, such as by telephone, to try to clear the exception before the interfacing process can continue. If the customer did pass the authentication process at decision Block 1203 or if the customer did not pass the authentication process at decision Block 1203 but the cause of the customer's failure was associated with, for example, the signer (as discussed above) as determined at decision Block 1204, or a CIP exception was made at Block 1205, the process may continue to Block 1206.

At Block 1206 a fraud detection process may be performed on the customer. Details of the fraud detection process appear below. If the customer does not pass the fraud detection process at decision Block 1207, the interfacing process may end at Block 1208. If the customer passes the fraud detection process at decision Block 1207, the customer may undergo an identity verification process as shown at Block 1209. Details of the identity verification process appear below. If the customer does not pass the identity verification process at decision Block 1210, the interfacing process may end at Block 1211. If the customer passes the identity verification process at decision Block 1210, the customer may be passed on for an account approval process and from there the customer may continue with the interfacing procedure as described herein.

FIGS. 13A through 13D comprise a flow chart representing an embodiment of a fraud detection portion of the disclosed early warning system subject matter. This flow chart may continue, for example, from Block 1205 in FIG. 12 where a CIP exception may be made. At decision Block 1301 a determination may be made as to whether a CIP exception was made and if so at Block 1302, the third entity (which may preferably be the signer identified by or associated with the customer) may be evaluated for the first fraud factor. If the third entity does not pass the first fraud factor evaluation at decision Block 1303, the signer may be dropped at Block 1304; otherwise an evaluation may be made for the third entity for the second fraud factor at Block 1305. At decision Block 1306 a determination may be made as to whether the third entity passed the second fraud factor evaluation. If the third entity does not pass the second fraud factor evaluation at decision Block 1306, the signer may be dropped at Block 1307, otherwise an identity verification evaluation of the third entity may be made at Block 1308. If the third entity does not pass the identity verification evaluation at decision Block 1309, the signer may be dropped at Block 1310. If the $3^{rd}$ entity passes the identity verification evaluation at decision Block 1309 or if not and the signer is dropped from the application at Block 1310, at decision Block 1311 if the CIP exception has not been cleared the process may end at Block 1312. If the CIP exception has been cleared, then the process may continue at FIG. 13B.

If no CIP exception was made, then at Block 1313 an evaluation may be made for a first entity (which may preferably be a business associated with the customer as discussed above) for a first fraud factor. If the first entity does not pass the first fraud factor evaluation at decision Block 1314, the process may end at Block 1315; otherwise an evaluation may be made for the first entity for a second fraud factor at Block 1316. The first fraud factor (sometimes referred to herein as an "LRM Hot File" or "Hot File") may preferably be a list of known fraudsters and/or abusers at the financial institution and may include former clients of the financial institution who have been "exited" from the financial institution, e.g., those who had an account closed by the financial institution due to various activity of the former client. The second fraud factor (sometimes referred to herein as a "Shared Fraud Database" or "Shared Fraud") may preferably be a list containing information from the financial institution and/or other financial institutions about known fraudsters and/or abusers and/or other clients (former or otherwise) who for some reason have been exited from a financial institution.

Returning attention back to FIG. 13A, at decision Block 1317 a determination may be made as to whether the first entity passed the second fraud factor evaluation. If the first entity does not pass the second fraud factor evaluation at decision Block 1317, at decision Block 1318 if the customer is not an existing client at the financial institution then the process may end at Block 1319. Otherwise, if the first entity passes the second fraud factor evaluation at decision Block 1317 or if the customer is an existing client at decision Block 1318, an evaluation may be made for a second entity (which may preferable be an authorized representative associated with the customer as discussed above) for the first fraud factor at Block 1320.

If the second entity does not pass the first fraud factor evaluation at decision Block 1321, the process may end at Block 1322; otherwise an evaluation may be made for the second entity for the second fraud factor at Block 1323. At decision Block 1324 a determination may be made as to whether the second entity passed the second fraud factor evaluation. If the second entity does not pass the second fraud factor evaluation at decision Block 1324, at decision Block 1325 if the customer is not an existing client at the financial institution then the process may end at Block 1326. Otherwise, if the second entity passes the second fraud factor evaluation at decision Block 1324 or if the customer is an existing client at decision Block 1325, then the process may continue at FIG. 13C.

Figure 13A:
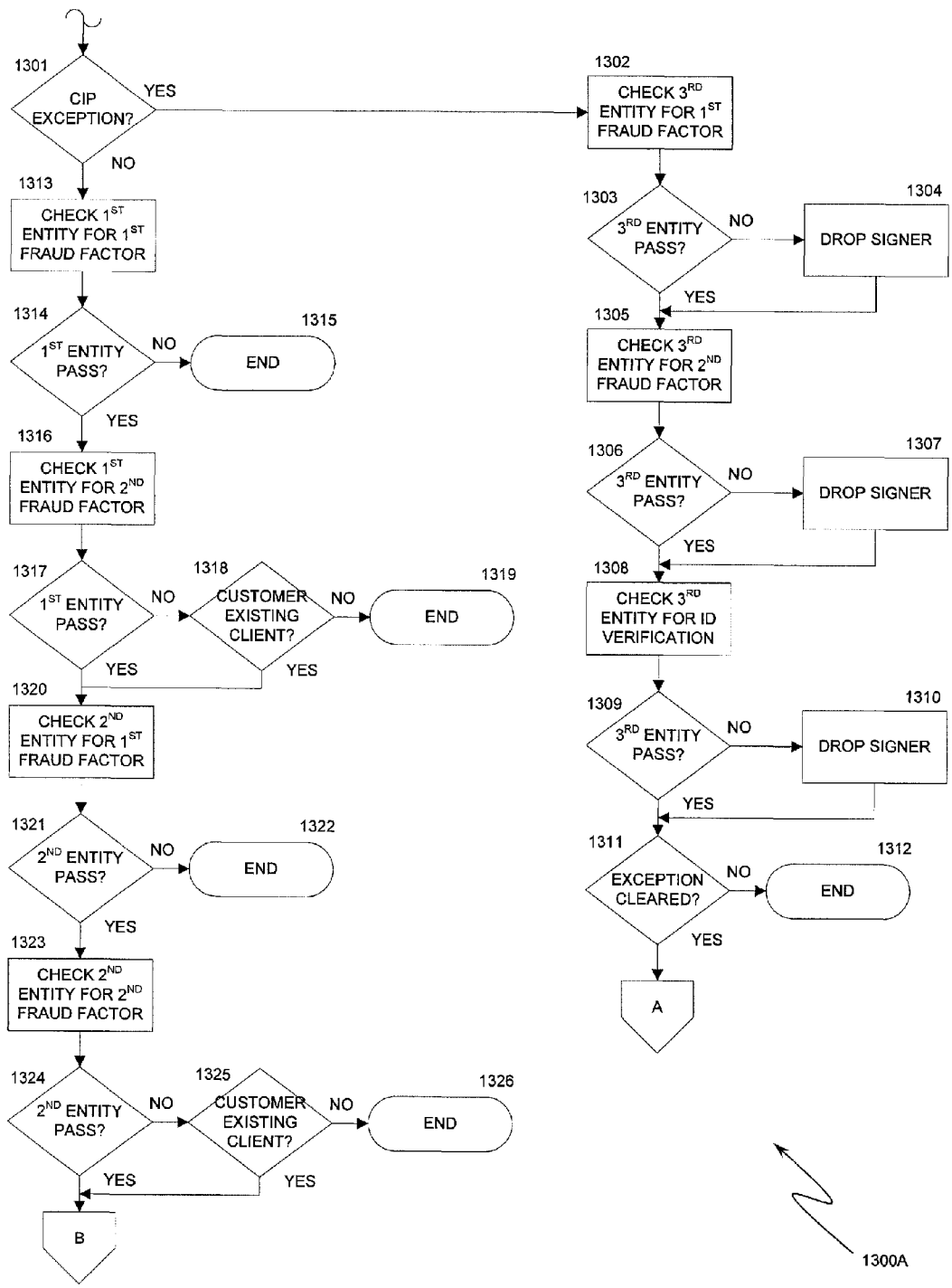
FIG. 13A is flow chart representing a portion of an embodiment of the disclosed early warning system subject matter.
Figure 13B:
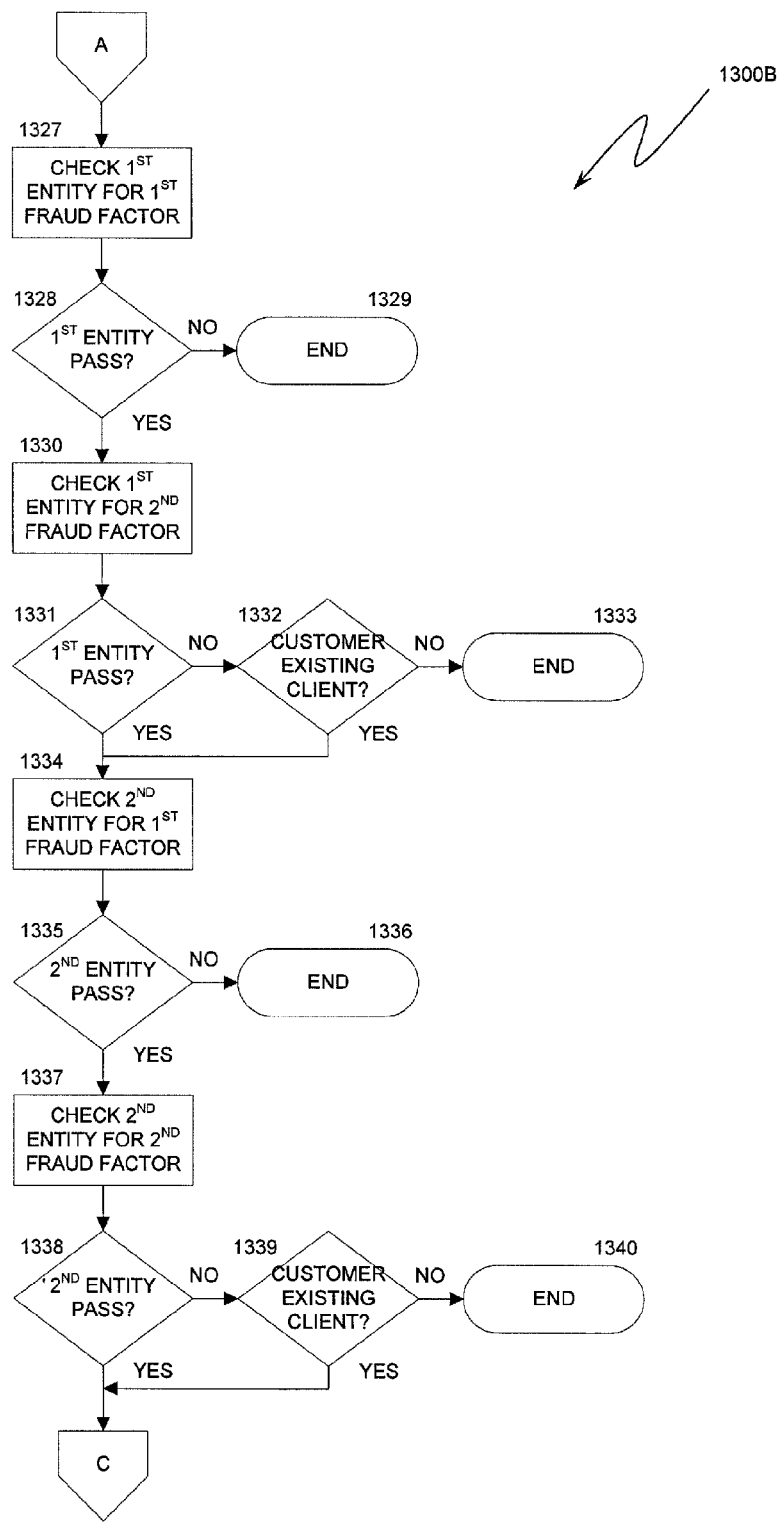
FIG. 13B is a flow chart representing a portion of an embodiment of the disclosed early warning system subject matter.

With attention now drawn to FIG. 13B where an exception was cleared at Block 1311 of FIG. 13A, an evaluation may be made at Block 1327 of FIG. 13B for the first entity for the first fraud factor. If the first entity does not pass the first fraud factor evaluation at decision Block 1328, the process may end at Block 1329; otherwise an evaluation may be made for the first entity for the second fraud factor at Block 1330. At decision Block 1331 a determination may be made as to whether the first entity passed the second fraud factor evaluation. If the first entity does not pass the second fraud factor evaluation at decision Block 1331, at decision Block 1332 if the customer is not an existing client at the financial institution then the process may end at Block 1333. Otherwise, if the first entity passes the second fraud factor evaluation at decision Block 1331 or if the customer is an existing client at decision Block 1332, an evaluation may be made for the second entity for the first fraud factor at Block 1334.

If the second entity does not pass the first fraud factor evaluation at decision Block 1335, the process may end at Block 1336; otherwise an evaluation may be made for the second entity for the second fraud factor at Block 1337. At decision Block 1338 a determination may be made as to whether the second entity passed the second fraud factor evaluation. If the second entity does not pass the second fraud factor evaluation at decision Block 1338, at decision Block 1339 if the customer is not an existing client at the financial institution then the process may end at Block 1340. Otherwise, if the second entity passes the second fraud factor evaluation at decision Block 1338 or if the customer is an existing client at decision Block 1339, the process may continue at FIG. 13D.

Figure 13C:
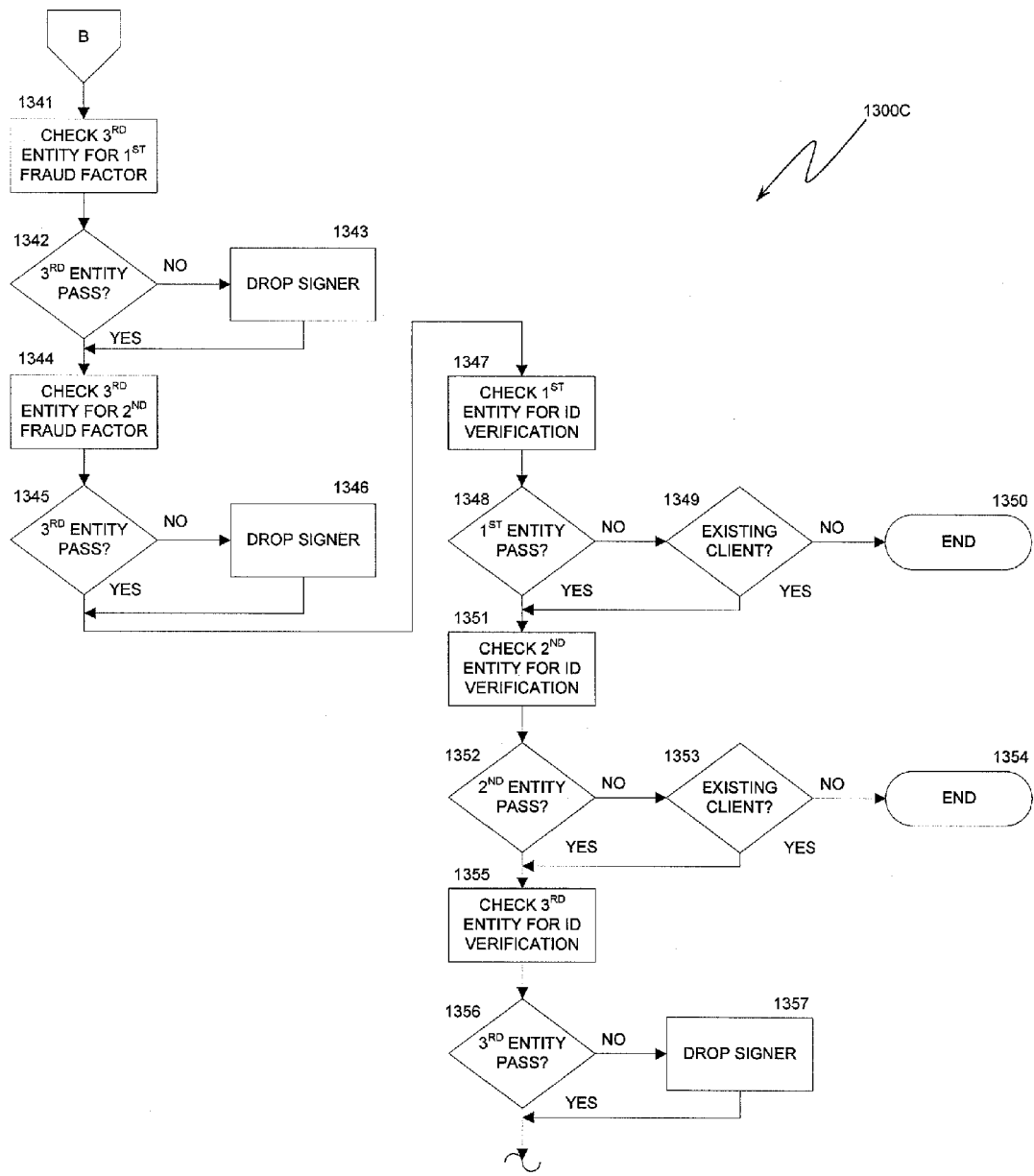
FIG. 13C is a flow chart representing a portion of an embodiment of the disclosed early warning system subject matter.

With attention now directed to FIG. 13C where the second entity either passes the second fraud factor evaluation at decision Block 1324 of FIG. 13A or if the customer is an existing client at decision Block 1325 of FIG. 13A, an evaluation may be made for a third entity (which may preferable be a signer associated with the customer as discussed above) for the first fraud factor at Block 1341. If the third entity does not pass the first fraud factor evaluation at decision Block 1342, the signer may be dropped at Block 1343; otherwise an evaluation may be made for the third entity for the second fraud factor at Block 1344. At decision Block 1345 a determination may be made as to whether the third entity passed the second fraud factor evaluation. If the third entity does not pass the second fraud factor evaluation at decision Block 1345, the signer may be dropped at Block 1346. Otherwise, if the third entity passes the second fraud factor evaluation at decision Block 1345 the process may continue for evaluation of identity verification.

At Block 1347 the first entity may be evaluated for identity verification. The identity verification may include a validation of the first entity's name and address given to the financial institution during the online interfacing procedure. The identity verification may also include validation of other information given to the financial institution by the customer during the online interfacing procedure. In a preferred embodiment, the customer and/or an entity associated with the customer may be given a "score" for the identity verification evaluation and that score may be compared with a predetermined threshold value. The threshold value may be the same for all entities or one or more of the threshold values may be different than the threshold values of the other entities. In a preferred embodiment, an entity's identity verification evaluation score which exceeds the appropriate threshold may indicate failure of the identity verification evaluation. If the first entity does not pass the identity verification evaluation at decision Block 1348, at decision Block 1349 if the customer is not an existing client at the financial institution then the process may end at Block 1350. Otherwise, if the first entity passes the identity verification evaluation at decision Block 1348 or if the customer is an existing client at decision Block 1349, the second entity may be evaluated for identity verification at Block 1351. If the second entity does not pass the identity verification evaluation at decision Block 1352, at decision Block 1353 if the customer is not an existing client at the financial institution then the process may end at Block 1354. Otherwise, if the second entity passes the identity verification evaluation at decision Block 1352 or if the customer is an existing client at decision Block 1353, an evaluation may be made for the third entity for identity verification at Block 1355. If the third entity does not pass the identity verification evaluation at decision Block 1356, the signer may be dropped at Block 1357 and the process may then continue.

Figure 13D:
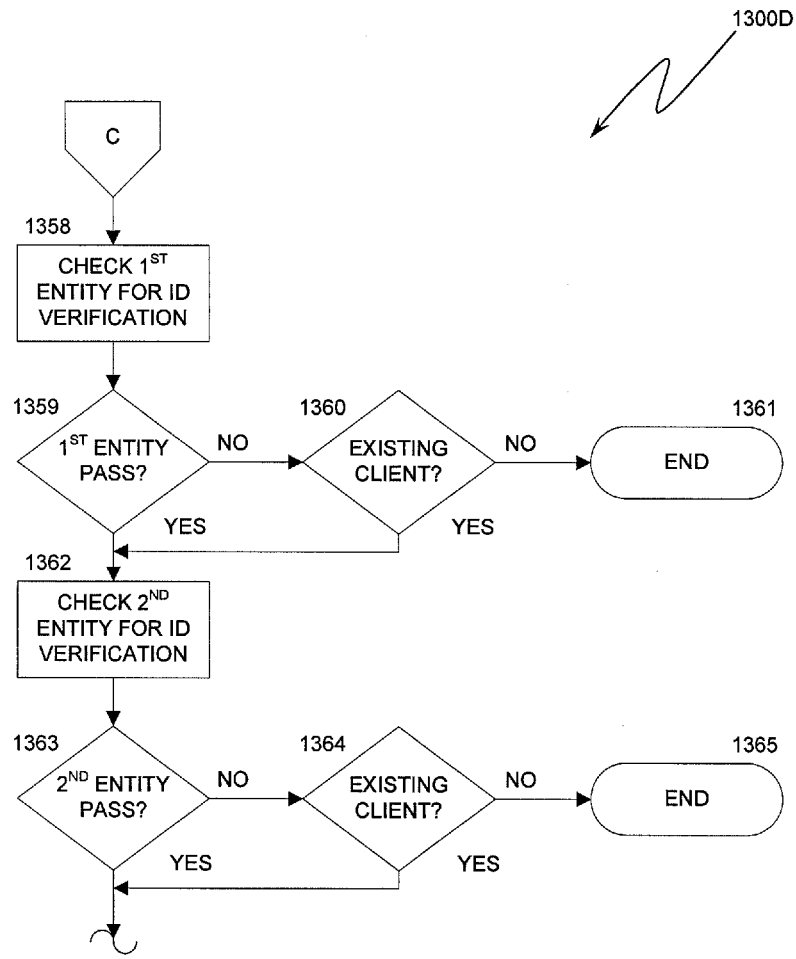
FIG. 13D is a flow chart representing a portion of an embodiment of the disclosed early warning system subject matter.

Moving now to FIG. 13D, where the second entity either passes the second fraud factor evaluation at decision Block 1338 of FIG. 13B or if the customer is an existing client at decision Block 1339 of FIG. 13B, at Block 1358 the first entity may be evaluated for identity verification as discussed above. If the first entity does not pass the identity verification evaluation at decision Block 1359, at decision Block 1360 if the customer is not an existing client at the financial institution then the process may end at Block 1361. Otherwise, if the first entity passes the identity verification evaluation at decision Block 1359 or if the customer is an existing client at decision Block 1360, the second entity may be evaluated for identity verification at Block 1362. If the second entity does not pass the identity verification evaluation at decision Block 1363, at decision Block 1364 if the customer is not an existing client at the financial institution then the process may end at Block 1365. Otherwise, if the second entity passes the identity verification evaluation at decision Block 1363 or if the customer is an existing client at decision Block 1364 the process may then continue.

Figure 14A:
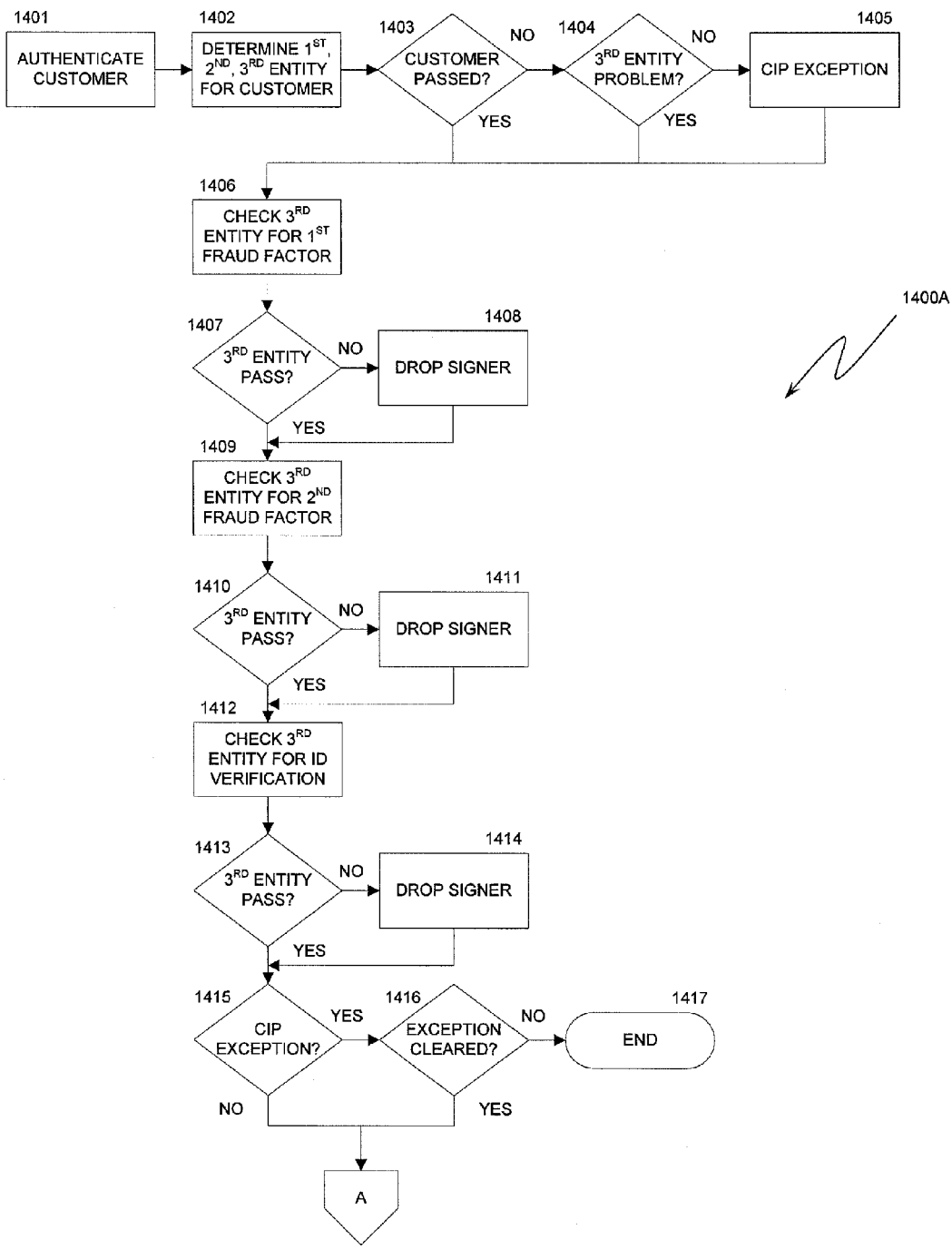
FIG. 14A is a flow chart representing a portion of another embodiment of a method for interfacing with a financial institution comprising the disclosed early warning system subject matter.
Figure 14B:
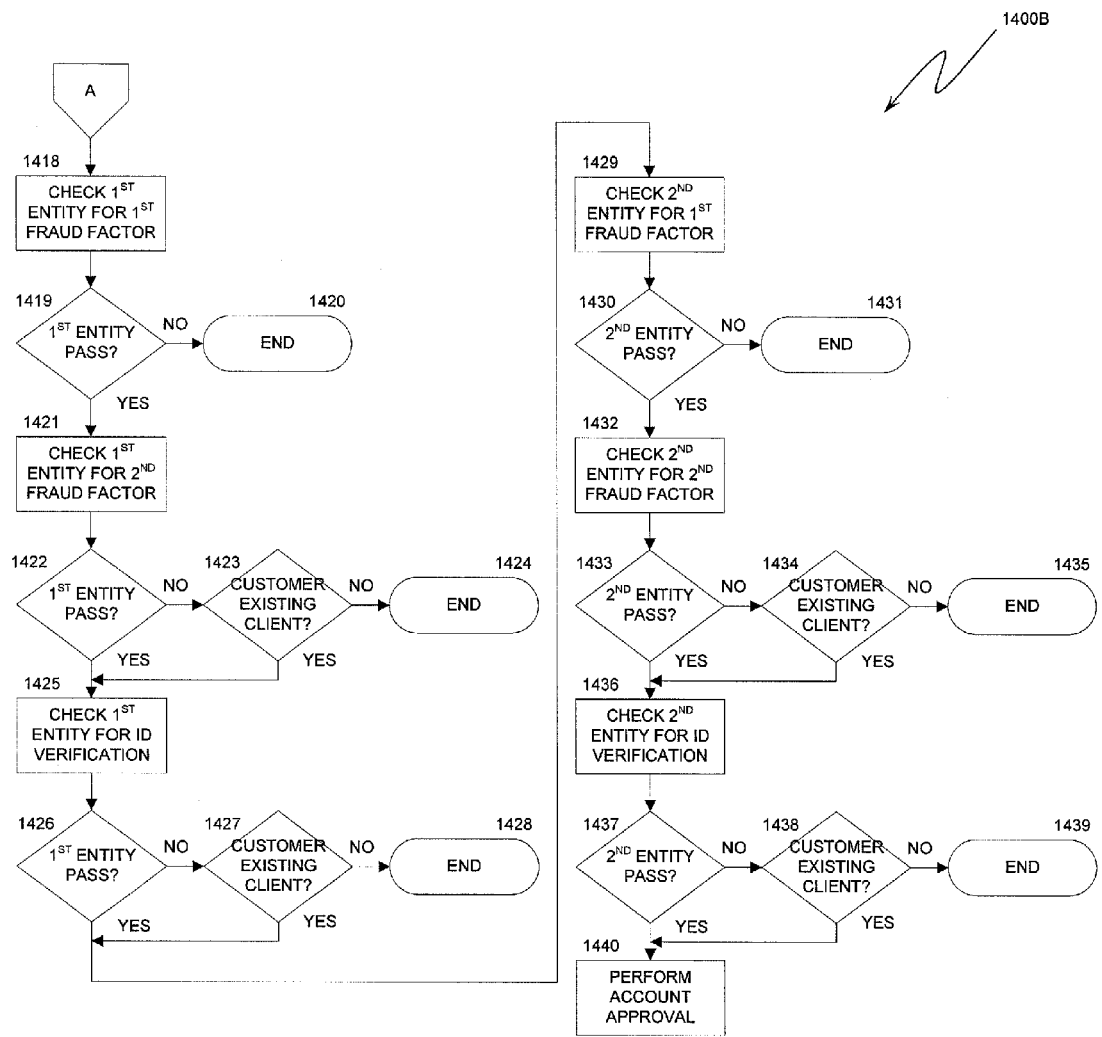
FIG. 14B is a flow chart representing a portion of another embodiment of a method for interfacing with a financial institution comprising the disclosed early warning system subject matter.

FIGS. 14A and 14B represent a flow chart of another embodiment of a method for interfacing with a financial institution comprising the disclosed early warning system subject matter. Referring now to FIG. 14A, typically, as discussed above, a customer may connect via a computer network (e.g., the internet, an intranet, an extranet, a wide area network, a piconet, a telephony network, a wireless network, etc.) to a website for a financial institution and request to interface with the financial institution through the website. The request may be, for example, to open an online business account, as described herein, with the financial institution. The financial institution may receive identification information for the customer and, at Block 1401, the financial institution may attempt to authenticate the customer (as discussed above) by, among other things, referring to a predetermined client identification profile ("CIP"). The CIP may contain information (public or otherwise) about the customer that was obtained either by the financial institution or for the financial institution from other sources. At Block 1402 the financial institution may determine entities associated with the customer as discussed above. At decision Block 1403 a determination may be made as to whether the customer has passed the authentication process, as discussed above. The determination of passing the authentication process may be based on individual checks on one or more of the entities associated with the customer. If the customer did not pass the authentication process, a determination may be made at decision Block 1404 as to whether a particular entity is the cause for the customer's failure to pass the authentication process. As discussed above, if the determination is that the cause for the authentication failure may be due to the business and/or authorized representative failing the authentication process (or that the signer is not the cause for the customer's failure to pass the authentication process) then at Block 1405 a CIP exception may be made as discussed above.

If the customer did pass the authentication process at decision Block 1403 or if the customer did not pass the authentication process at decision Block 1403 but the cause of the customer's failure was associated with, for example, the signer as determined at decision Block 1404, or if a CIP exception was made at Block 1405, the process may continue to Block 1406.

At Block 1406, the third entity (which, preferably, is the signer as the signer typically may not cause a CIP exception at Block 1405) may be evaluated for the first fraud factor. If the third entity does not pass the first fraud factor evaluation at decision Block 1407, the signer may be dropped at Block 1408; otherwise an evaluation may be made for the third entity for the second fraud factor at Block 1409. At decision Block 1410 a determination may be made as to whether the third entity passed the second fraud factor evaluation. If the third entity does not pass the second fraud factor evaluation at decision Block 1410, the signer may be dropped at Block 1411, otherwise an identity verification evaluation of the third entity may be made at Block 1412. If the third entity does not pass the identity verification evaluation at decision Block 1413, the signer may be dropped at Block 1414.

If the third entity passes the identity verification evaluation at decision Block 1412 or if the signer is dropped at Block 1414, at decision Block 1415 if there was no CIP exception made at Block 1405 then the process may continue at FIG. 14B. If at decision Block 1415 a CIP exception made at Block 1405, at decision Block 1416 a determination is made as to whether the CIP exception has been cleared. If the CIP exception has not been cleared at decision Block 1416, then the interfacing process may end at Block 1417. If the CIP exception has been cleared at decision Block 1416, the process may continue at FIG. 14B.

With reference now to FIG. 14B, the process may continue on to Block 1418 where the first entity may be evaluated for the first fraud factor. If the first entity does not pass the first fraud factor evaluation at decision Block 1419, the process may end at Block 1420; otherwise an evaluation may be made for the first entity for the second fraud factor at Block 1421. At decision Block 1422 a determination may be made as to whether the first entity passed the second fraud factor evaluation. If the first entity does not pass the second fraud factor evaluation at decision Block 1422, at decision Block 1423 if the customer is not an existing client at the financial institution then the process may end at Block 1424. Otherwise, if the first entity passes the second fraud factor evaluation at decision Block 1422 or if the customer is an existing client at decision Block 1243, the first entity may undergo an identity verification evaluation at Block 1425. If the first entity does not pass the identity verification evaluation at decision Block 1426, at decision Block 1427 if the customer is not an existing client at the financial institution then the process may end at Block 1428. Otherwise, if the first entity passes the identity verification evaluation at decision Block 1426 or if the customer is an existing client at decision Block 1427, the process may continue.

With continuing reference to FIG. 14B, the second entity may be evaluated for the first fraud factor at Block 1429. If the second entity does not pass the first fraud factor evaluation at decision Block 1430, the process may end at Block 1431; otherwise an evaluation may be made for the second entity for the second fraud factor at Block 1432. At decision Block 1433 a determination may be made as to whether the second entity passed the second fraud factor evaluation. If the second entity does not pass the second fraud factor evaluation at decision Block 1433, at decision Block 1434 if the customer is not an existing client at the financial institution then the process may end at Block 1435. Otherwise, if the second entity passes the second fraud factor evaluation at decision Block 1433 or if the customer is an existing client at decision Block 1434, the second entity may undergo an identity verification evaluation at Block 1436. If the second entity does not pass the identity verification evaluation at decision Block 1437, at decision Block 1438 if the customer is not an existing client at the financial institution then the process may end at Block 1439. Otherwise, if the second entity passes the identity verification evaluation at decision Block 1437 or if the customer is an existing client at decision Block 1438, the process may continue to performing account approval at Block 1440.

FIG. 15A is a table 1501 representing business rules and a table 1502 representing authorized representative rules for an embodiment of an early warning system of the disclosed subject matter. With reference to table 1501, the first column lists results for the Hot File evaluation, the second column lists whether the customer is an existing client of the financial institution, the third column lists results for the Shared Fraud evaluation, the fourth column lists results for the identity verification evaluation, and the fifth column lists the overall outcome of the evaluation given the results in the first four columns. As an example for following the logic in table 1501, assume that the business associated with the customer is referred to as the first entity. Then, for the first of the five rows of results that appears in table 1501, if the first entity fails the Hot File evaluation the overall outcome is that the customer will "fail", i.e., the customer will not be allowed to continue with the online interfacing procedure. In this case, this result will occur regardless of any other evaluations that may be performed or the status of the customer as a new or existing client of the financial institution. For the second row of results, if the first entity fails the Shared Fraud evaluation and if the customer is a new client of the financial institution (i.e., the customer is not an existing client) then the overall outcome is "fail". For the third row of results, if the first entity fails the identity verification evaluation (i.e., the score exceeds a predetermined threshold as discussed above) and if the customer is a new client, the overall outcome is "fail". For the fourth row of results, if the first entity passes the Hot File, Shared Fraud, and identity verification evaluations and is a new client, the overall outcome is "pass". For the fifth row of results, if the first entity is an existing client and passes the Hot File evaluation the overall outcome is "pass" regardless of the results of the Shared Fraud and identity verification evaluations.

With reference to table 1502, which is the authorized representative rules for the authorized representative associated with the customer, the columns and results are the same as described above for table 1501 for the business rules.

FIG. 15B is a table 1503 representing signer rules for the signer associated with the customer for an embodiment of an early warning system of the disclosed subject matter. With reference to table 1503, the first column lists results for the Hot File evaluation, the second column lists results for the Shared Fraud evaluation, the third column lists results for the identity verification evaluation, and the fourth column lists the overall outcome of the evaluation given the results in the first three columns. As an example for following the logic in table 1503, assume that the signer associated with the customer is referred to as the third entity. For the first of the four rows of results, if the third entity fails the Hot File evaluation the overall outcome is that the signer is "dropped", i.e., the customer may be allowed to continue with the online interfacing procedure but not with the signer associated with the customer. In this case, this result will occur regardless of any other evaluations that may be performed. For the second row of results, if the third entity fails the Shared Fraud evaluation the overall outcome is that the signer is "dropped". For the third row of results, if the third entity fails the identity verification evaluation (i.e., the score exceeds a predetermined threshold as discussed above) the overall outcome is that the signer is "dropped". For the fourth row of results, if the third entity passes the Hot File, Shared Fraud, and identity verification evaluations, the overall outcome is "pass", i.e., the customer can continue with the online interfacing procedure with the signer associated with the customer.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

What we claim is:

1. A method of interfacing with a financial institution using a computer interface, the method comprising the steps of:
   (a) receiving an interface request from a customer after the customer has reached, via a path through a computer network, a predetermined webpage on a computer system for the financial institution;
   (b) receiving, at a processor, identification information from the customer;
   (c) determining, using the processor, a first, a second, and a third entity for the customer, wherein the first entity is a business associated with the customer, the second entity is an authorized representative associated with the customer, and the third entity is an authorized signer associated with the customer;
   (d) evaluating the customer for authentication, using the processor, based at least in part on an evaluation of a predetermined client identification profile ("CIP") for the customer;
   (e) evaluating the first entity for the customer for authentication, using the processor, based at least in part on an evaluation of a predetermined CIP for the first entity;
   (f) evaluating the second entity for the customer for authentication, using the processor, based at least in part on an evaluation of a predetermined CIP for the second entity;
   (g) evaluating the third entity for the customer for authentication, using the processor, based at least in part on an evaluation of a predetermined CIP for the third entity;
   (h) creating an exception, using the processor, in the event at least one of the customer, first entity, and second entity fail authentication;
   (i) performing, using the processor, a fraud detection analysis individually on the customer, the first entity, and the second entity, and stopping the interfacing method in the event at least one of the customer, the first entity, and the second entity does not pass the fraud detection analysis;
   (j) performing, using the processor, the fraud detection analysis on the third entity and disregarding the third entity for the remainder of the interfacing method in the event the third entity does not pass the fraud detection analysis;
   (k) performing, using the processor, an identity verification analysis individually on the customer, the first entity, and the second entity, and stopping the interfacing method in the event at least one of the customer, the first entity, and the second entity does not pass the identity verification analysis;
   (l) performing, using the processor, the identity verification analysis on the third entity and disregarding the third entity for the remainder of the interfacing method in the event the third entity does not pass the identity verification analysis; and
   (m) performing, using the processor, an account approval process for the customer.

2. The method of claim 1 wherein
   the identity verification analysis comprises comparing, respectively, an identity verification score for the first entity against a first predetermined threshold,
   comparing an identity verification score for the second entity against a second predetermined threshold, and
   comparing an identity verification score for the third entity against a third predetermined threshold.

3. The method of claim 1 wherein the first fraud factor is a list comprising known fraudsters identified by the financial institution and the second fraud factor is a database of known fraudsters or abusers identified by the financial institution or a second financial institution.

4. A method for an account approval process with a financial institution using a computer interface, the method comprising the steps of:
   (a) receiving an interface request from a customer after the customer has reached, via a path through a computer network, a predetermined webpage on a computer system for the financial institution;
   (b) receiving, at a processor, identification information from the customer;
   (c) determining, using the processor, a first, a second, and a third entity for the customer, wherein the first entity is a business associated with the customer, the second entity is an authorized representative associated with the customer, and the third entity is an authorized signer associated with the customer;
   (d) evaluating the customer for authentication, using the processor, based at least in part on an evaluation of a predetermined client identification profile ("CIP") for the customer;
   (e) evaluating the first entity for the customer for authentication, using the processor, based at least in part on an evaluation of a predetermined CIP for the first entity;
   (f) evaluating the second entity for the customer for authentication, using the processor, based at least in part on an evaluation of a predetermined CIP for the second entity;
   (g) evaluating the third entity for the customer for authentication, using the processor, based at least in part on an evaluation of a predetermined CIP for the third entity;
   (h) creating an exception, using the processor, in the event at least one of the customer, first entity, and second entity fail authentication;
   (i) performing, using the processor, a fraud detection analysis on the customer and stopping the account approval process in the event the customer does not pass the fraud detection analysis;
   (j) performing, using the processor, an identity verification analysis on the customer and stopping the account approval process in the event the customer does not pass the identity verification analysis;
   (k) in the event an exception is not created:
      (A) performing, using the processor, a first fraud detection analysis on each of the first entity and the second entity, and stopping the account approval process in the event at least one of the first entity and the second entity does not pass the first fraud detection analysis;
      (B) performing, using the processor, a second fraud detection analysis on each of the first entity and the second entity, and continuing the account approval process in the event both the first entity and the second entity pass the second fraud detection analysis or in the event either the first or second entity do not pass the second fraud detection analysis but the customer is an existing client of the financial institution;
      (C) performing, using the processor, the first and the second fraud detection analysis on the third entity and disregarding the third entity for the remainder of the account approval process in the event the third entity does not pass either the first or the second fraud detection analysis;
      (D) performing, using the processor, the identity verification analysis on each of the first entity and the second entity, and continuing the account approval process in the event both the first entity and the second entity pass the identity verification analysis or in the event either the first or second entity do not pass the identity verification analysis but the customer is an existing client of the financial institution;

(E) performing, using the processor, the identity verification analysis on the third entity and disregarding the third entity for the remainder of the account approval process in the event the third entity does not pass the identity verification analysis;

(l) in the event an exception is created:

(A) performing, using the processor, the first and the second fraud detection analysis on the third entity and disregarding the third entity for the remainder of the account approval process in the event the third entity does not pass either the first or the second fraud detection analysis;

(B) performing, using the processor, the identity verification analysis on the third entity and disregarding the third entity for the remainder of the account approval process in the event the third entity does not pass the identity verification analysis;

(C) continuing with the account approval process in the event the exception is cleared, otherwise stopping the account approval process;

(D) performing, using the processor, the first fraud detection analysis on each of the first entity and the second entity, and stopping the account approval process in the event at least one of the first entity and the second entity does not pass the first fraud detection analysis;

(E) performing, using the processor, the second fraud detection analysis on each of the first entity and the second entity, and continuing the account approval process in the event both the first entity and the second entity pass the second fraud detection analysis or in the event either the first or second entity do not pass the second fraud detection analysis but the customer is an existing client of the financial institution;

(F) performing, using the processor, the identity verification analysis on each of the first entity and the second entity, and continuing the account approval process in the event both the first entity and the second entity pass the identity verification analysis or in the event either the first or second entity do not pass the identity verification analysis but the customer is an existing client of the financial institution;

(m) approving an account for the customer.

5. The method of Claim 4 wherein
the identity verification analysis comprises comparing, respectively, an identity verification score for the first entity against a first predetermined threshold,
comparing an identity verification score for the second entity against a second predetermined threshold, and
comparing an identity verification score for the third entity against a third predetermined threshold.

6. The method of claim 4 wherein the first fraud factor is a list comprising known fraudsters identified by the financial institution and the second fraud factor is a database of known fraudsters or abusers identified by the financial institution or a second financial institution.

* * * * *